United States Patent
Yin et al.

(10) Patent No.: US 9,813,841 B2
(45) Date of Patent: Nov. 7, 2017

(54) WIRELESS WIDE AREA NETWORK (WWAN) ASSISTED PROXIMITY WIRELESS LOCAL AREA NETWORK (WLAN) PEER-TO-PEER (P2P) CONNECTION AND OFFLOADING

(75) Inventors: Hujun Yin, Saratoga, CA (US); Rongzhen Yang, Shanghai (CN); Jin Fu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 867 days.

(21) Appl. No.: 13/997,253

(22) PCT Filed: Dec. 20, 2011

(86) PCT No.: PCT/US2011/066160
§ 371 (c)(1),
(2), (4) Date: Jun. 22, 2013

(87) PCT Pub. No.: WO2013/095382
PCT Pub. Date: Jun. 27, 2013

(65) Prior Publication Data
US 2014/0115058 A1  Apr. 24, 2014

(51) Int. Cl.
*H04W 4/00* (2009.01)
*H04W 76/02* (2009.01)
(Continued)

(52) U.S. Cl.
CPC .......... *H04W 4/005* (2013.01); *H04W 12/06* (2013.01); *H04W 76/023* (2013.01); *H04W 84/12* (2013.01); *H04W 88/06* (2013.01)

(58) Field of Classification Search
None
See application file for complete search history.

(56) References Cited

U.S. PATENT DOCUMENTS

| 7,978,691 B1* | 7/2011 | Cole | H04W 40/24 370/252 |
| 2007/0190944 A1* | 8/2007 | Doan | H04M 1/72569 455/63.1 |

(Continued)

FOREIGN PATENT DOCUMENTS

| CN | 101253739 A | 8/2008 |
| EP | 2161962 A1 | 3/2010 |

(Continued)

OTHER PUBLICATIONS

International Preliminary Report on Patentability and Written Opinion received for PCT Patent Application No. PCT/US2011/066160, dated Jul. 3, 2014, 6 pages.

(Continued)

*Primary Examiner* — Jeffrey R Swearingen
(74) *Attorney, Agent, or Firm* — Thorpe North & Western (57) ABSTRACT

A system and method for wireless wide area network (WWAN) assisted proximity wireless local area network (WLAN) peer-to-peer (P2P) connection and offloading is disclosed. The method includes the operation of identifying a first wireless device and a second wireless device between which a WLAN P2P connection is desired. Each wireless device can have a WWAN radio and a WLAN radio. WLAN information can be sent for at least one of the first and second wireless devices via the WWAN to a P2P configuration server. A WLAN P2P configuration can be received from the P2P configuration server at the first and second wireless devices via the WWAN for WLAN P2P communication between the first and second wireless devices. A WLAN P2P connection can be set up between the first and second wireless devices using the WLAN P2P configuration. The first and the second wireless devices can communicate using the WLAN P2P connection.

18 Claims, 7 Drawing Sheets

(51) Int. Cl.
*H04W 12/06* (2009.01)
*H04W 88/06* (2009.01)
*H04W 84/12* (2009.01)

(56) References Cited

U.S. PATENT DOCUMENTS

| | | |
|---|---|---|
| 2007/0297426 A1 | 12/2007 | Haveson et al. |
| 2008/0019333 A1 | 1/2008 | Kharia et al. |
| 2010/0128701 A1* | 5/2010 | Nagaraja ............... H04W 76/02 370/338 |
| 2014/0094122 A1* | 4/2014 | Etemad ................ H04W 76/02 455/41.2 |

FOREIGN PATENT DOCUMENTS

| | | |
|---|---|---|
| KR | 10-2010-0132009 A | 12/2010 |
| WO | WO 2011109941 A1 | 9/2011 |
| WO | 2013/095382 A1 | 6/2013 |

OTHER PUBLICATIONS

International Search Report and Written Opinion received for PCT application No. PCT/US2011/066160, dated Apr. 10, 2012, 9 pages.
Supplementary ESR issued for EP 11 87 7978 dated Nov. 27, 2015.

* cited by examiner

ND AREA NETWORK (WLAN) PEER-TO-PEER (P2P) CONNECTION AND OFFLOADING

WIRELESS WIDE AREA NETWORK (WWAN) ASSISTED PROXIMITY WIRELESS LOCAL AREA NETWORK (WLAN) PEER-TO-PEER (P2P) CONNECTION AND OFFLOADING

BACKGROUND

Wireless mobile communication technology uses various standards and protocols to transmit data between a transmission station and a wireless mobile device. Some wireless devices communicate using orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE).

The 3GPP LTE or WiMax standards and protocols can be used in a wireless wide area network (WWAN). The WiFi standards and protocols can be used in a wireless local area network (WLAN). The WWAN can cover a larger area than the WLAN and can use transmission stations with a greater transmission power than the transmission power or WLAN transmission stations. The larger size of a WWAN compared to a WLAN network can use different technology and equipment. A wireless device can use a WWAN radio to communicate with the WWAN. A wireless device can use a WLAN radio to communicate with the WLAN. Wireless devices can include both WWAN and WLAN radios to allow communication with both WWAN and WLAN networks.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

DEFINITIONS

As used herein, the term "mobile device," "wireless device," or "wireless mobile device," refers to a computing device capable of wireless digital communication such as a smart phone, a tablet computing device, a laptop computer, a multimedia device such as an iPod Touch®, or other type computing device that provides text or voice communication.

As used herein, a "server" refers to a physical computer dedicated to running one or more service programs used to serve the needs of programs running on other computing devices that are in communication with the server. The service program(s) can serve the needs or requests of other programs which may or may not be running on the same computer. A server can be a system comprised of software and hardware that is dedicated to a specific purpose such as a database server, a file server, a mail server, a print server, a telephony server, a credentials server, and so forth. Alternatively, a single server can be used to provide multiple services.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless devices having multiple radios, referred to as multi-comm devices, can use the advantages of both radios to increase the speed of communication while decreasing the cost and amount of power used to transfer data. For example, wireless devices that support both WWAN (LTE or WiMAx) and WLAN (WiFi) communication can be used to perform peer-to-peer (P2P) type communication. Multi-comm capability can refer to a wireless device with at least two radios, where each radio uses a different wireless communication protocol and standard, and at least some information from each radio can be exchanged between radios in the device.

One form of communication between wireless devices is proximity communication. Proximity communication typically refers to communication over a WLAN when to wireless devices are both within a proximity of the WLAN. Proximity communication can also refer to communication when two or more wireless devices are within a close proximity of the other wireless devices.

Proximity communication applications can provide applications for wireless devices in close proximity to each other. For example, a bump application can allow two wireless devices to bump together, which can trigger the bumped wireless devices to look for the other wireless device. The bump application on the wireless device may use the WWAN or the WLAN to identify and communicate with the other device. The bump application may be used for a number of different purposes. For example, a bump application can be used to allow the wireless devices to exchange contact information of their users or to deliver a file or allow a data transfer from one wireless device to the other wireless device. Additional applications are also possible.

Proximity communication applications, such as the bump application, may not take advantage of the multi-comm capability in the terminals, which can result in sub-optimal performance. A WWAN, such as an LTE or WiMax network, can provide more secure authentication and authorization as compared to a WLAN. However, compared with the capabilities of a typical WLAN, the WWAN may also have relatively low speed data transmission at a high cost per bit with a higher power consumption for large-size content exchange through the WWAN. A WWAN can have a lower bandwidth for uplink (UL) transmissions relative to the bandwidth for downlink (DL) transmissions. A DL transmission can be a communication from the transmission station (or eNodeB) to the mobile device (or UE). An UL transmission can be a communication from the mobile device to the transmission station. Large-size content exchange can contribute to WWAN over-load due to heavy uplink and/or downlink traffic load. In contrast, the WLAN, such as a WiFi network, can have a low power consumption with a relatively long setup time for content exchange through the WLAN.

The capability of multiple radios in the mobiles devices can be used to maximize the capabilities of a WWAN radio and a WLAN radio. For instance, a multi-comm wireless device can be used to provide WWAN assisted proximity WLAN P2P connection and offloading. The proximity communication can leverage the capability of multi-radio devices and the efficiencies of both the WWAN and the WLAN. The WWAN can provide basic proximity information exchange and assist a fast setup of the low power WLAN P2P link, while the WLAN can provide a relatively low power WLAN P2P link used for large content transfer. Using both the WWAN and WLAN in proximity communication applications can improve the speed of data transfers and conserve the power resources of the wireless devices.

Figure 1:
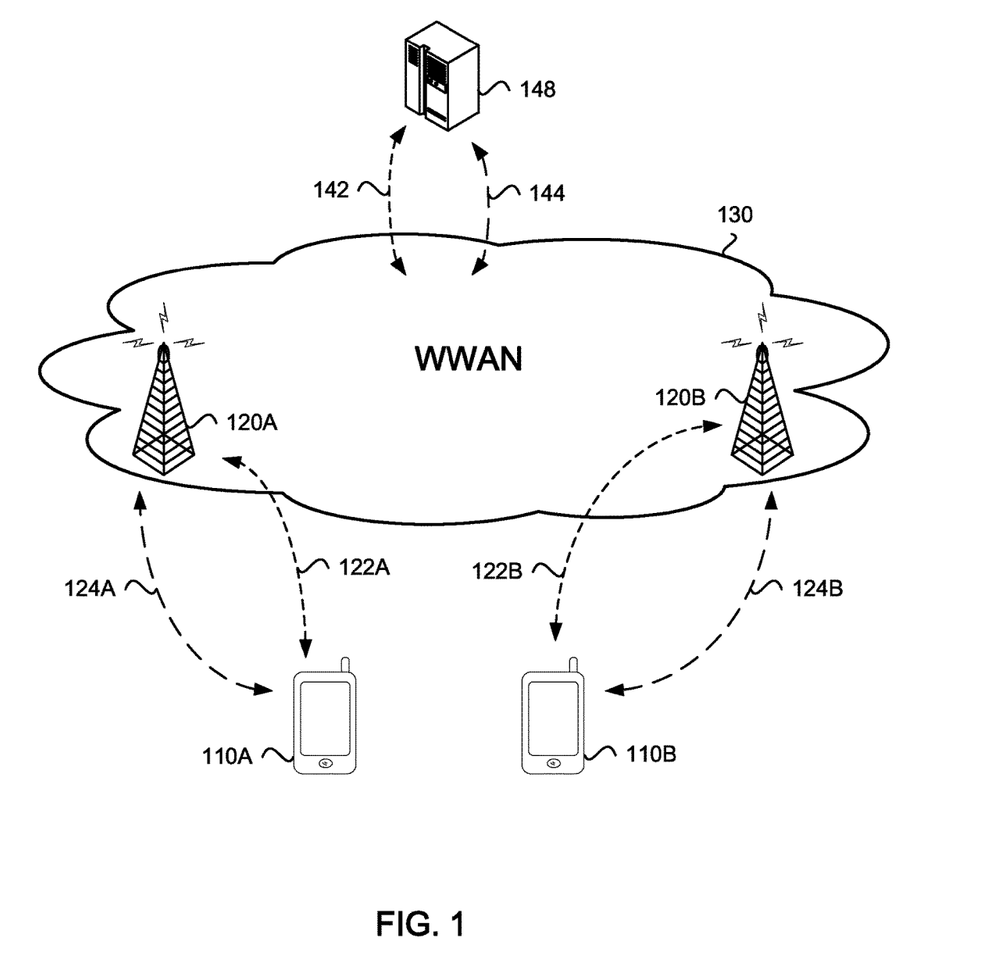
FIG. 1 illustrates a block diagram of two wireless devices communicating with a wireless wide area network (WWAN) in accordance with an example.

FIG. 1 illustrates two wireless devices in close proximity to each other communicating with each other through just the WWAN. A first wireless device 110A and/or a second wireless device 110B can trigger an identification of each other using a proximity application. The proximity application can include bump detection by monitoring sensors or sensor data, such as the accelerometer and/or the location of the handset (via GPS or other mechanism). Alternatively, proximity application can provide a text or graphics user interface (UI) in the wireless used by the user to indicate the intention of sending the data content, such as file(s), to another nearby wireless device.

In another example, the proximity application can determine another action, such as swinging the wireless devices, by monitoring sensors or sensor data, which may activate or trigger the identification of the other device. After an identification trigger, such as a bump or swing of the mobile devices, and associated WWAN signaling, a confirmation message or request at each wireless device can identify the other wireless device and allow the user to confirm a content transfer or exchange with the other wireless device. A content transfer or exchange may occur when a confirmation is received by both wireless devices.

For the identification of the second wireless device 110B and content exchange, the first mobile device 110A can communicate with a first transmission station 120A of the WWAN 130. The communication can include authentication and/or authorization 124A of the first mobile device with the WWAN and a data stream for the exchange 122A. Likewise, the second mobile device can communicate with a second transmission station 120B of the WWAN, and the communication can include authentication and/or authorization 124B of the second mobile device with the WWAN and a data stream for the exchange 122B.

In an example, the first transmission station 120A and the second transmission station 120B may be the same transmission station. Both the first 110A and second 110B mobile devices can include WWAN radios and may communicate with the WWAN 130 using the WWAN radios. The first mobile device or the second mobile device may use different service providers or a same service provider. A backend service support server 148 may be used to facilitate the authentication and/or authorization 144 of the first or second mobile devices, identification of the first or second mobile devices, or the data stream for exchange 142 between the first or second mobile devices.

As illustrated in FIG. 1, the WWAN can provide both the setup, including authentication and/or authorization, and the data content exchange between the first or second mobile devices, which can be inefficient compared to using a WLAN for data content exchange (or offloading). Data content can include a multimedia stream, a video stream, an audio stream, a graphics file, an audio file, a text file, an executable file, a multimedia file, or another type of data file. A bump application can provide the natural interface for content exchange through the WWAN for wireless devices (or terminals) in proximity. However, content exchange may be purely through a WWAN connection. The first or second mobile devices can include WLAN radios, but the WLAN radios may not be used in the WWAN communication between wireless devices and may not be configured to communicate with each other despite the close proximity to each other.

Figure 2:
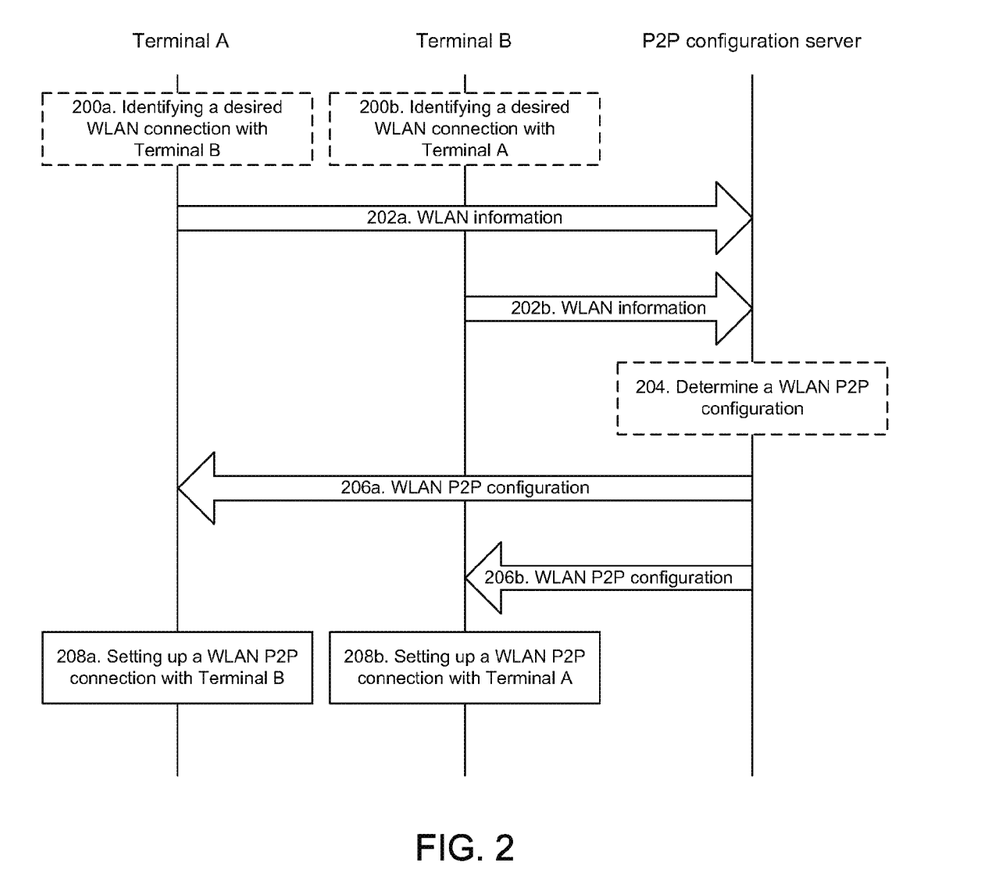
FIG. 2 illustrates an example process for wireless wide area network (WWAN) assisted proximity wireless local area network (WLAN) peer-to-peer (P2P) connection and offloading in accordance with an example.

FIG. 2 illustrates a flow chart in which two wireless devices in close proximity are configured to communicate with each other through both the WWAN and the WLAN. Each wireless device can include a WWAN radio and a WLAN radio. The first wireless device is referred to as terminal A, while the second wireless device is referred to as terminal B. Terminal A and terminal B can use an always on WWAN radio for basic proximity information exchange, such used in a bump detection. In addition, the WWAN can be used to assist fast setup of a relatively low power WLAN peer-to-peer (P2P) link between the terminals. The terminal A and the terminal B can use the WLAN to provide a low power WLAN P2P link. The link may be used for substantially any type of data transfer, but can be especially advantageous when used for large content transfer. FIG. 2 illustrates a hybrid P2P connection. In contrast, a pure P2P network allows wireless devices to directly communicate with each other without the use of a WWAN or WLAN transmission station. In a pure P2P connection, wireless devices within range of each other can discover and communicate directly without involving central access points, such as a transmission station.

The WWAN radio can use a WWAN protocol including a 3GPP LTE standard or an IEEE 802.16 standard (WiMax). A WWAN protocol of the WWAN radio can provide authentication, authorization, and identification functionality for the WLAN P2P connection. The 3GPP LTE standard can include LTE Rel-8 (2008), LTE Rel-9 (2009), and LTE Rel-10 (2011). The IEEE 802.16 standard can include IEEE 802.16e-2005, IEEE 802.16k-2007, IEEE 802.16-2009, IEEE 802.16j-2009, IEEE 802.16h-2010, and IEEE 802.16m-2011.

The WLAN radio can use a WLAN protocol including an IEEE 802.11 standard (WiFi), an IEEE 802.15 standard, a Bluetooth standard, a Wireless DisplayPort standard, a WiGig standard, an Ultra-WideBand (UWB) standard, a Wireless HD standard, a Wireless Home Digital Interface (WHDI) standard, a ZigBee standard, or another type of WLAN standard. IEEE 802.11 is a set of standards for implementing wireless local area network (WLAN) computer communication in the 2.4, 3.6 and 5 gigahertz (GHz) frequency bands. The IEEE 802.11 standard can include IEEE 802.11g-2003, IEEE 802.11-2007, and IEEE 802.11n-2009. The IEEE 802.11 standards provide the basis for wireless network products using the Wi-Fi brand name. IEEE 802.15 is a working group of the Institute of Electrical and Electronics Engineers (IEEE) 802 standards committee which specifies wireless personal area network (PAN) standards. The IEEE 802.15 standard can include IEEE 802.15.3-2003, IEEE 802.15.3b-2005, IEEE 802.15.3c-2009, and IEEE 802.15.4-2006. Bluetooth is a proprietary open wireless technology standard for exchanging data over short distances (using short wavelength radio transmissions in the industrial, scientific and medical (ISM) band from 2400-2480 MHz) from fixed and mobile devices, creating personal area networks (PANs) with high levels of security. The Wireless Gigabit Alliance (also known as the WiGig) is an organization promoting the adoption of multi-gigabit speed wireless communications technology operating over the unlicensed 60 GHz frequency band. Wireless DisplayPort is a standard which enables DisplayPort bandwidth and feature set for cable-free applications operating in 60 GHz radio band. DisplayPort is a cooperative effort by the WiGig Alliance and the Video Electronics Standards Association (VESA). Ultra-wideband (UWB, ultra-wide band, or ultraband) is a radio technology that can be used at very low energy levels for short-range high-bandwidth communications by using a large portion of the radio spectrum. Wireless Universal Serial Bus (WUSB) is a short-range, high-bandwidth wireless radio communication protocol created by the Wireless USB Promoter Group. Wireless USB is based on the WiMedia Alliance's Ultra-WideBand (UWB) common radio platform, which is capable of sending 480 megabits/second (Mbit/s) at distances up to 3 meters and 110 Mbit/s at up to 10 meters. WUSB is designed to operate in the 3.1 to 10.6 GHz frequency range. WirelessHD is an industry-led effort to define a specification for the next generation wireless digital network interface for wireless high-definition signal transmission for consumer electronics products. Wireless Home Digital Interface (WHDI) is a consumer electronic standard for a wireless HDTV connectivity throughout the home. ZigBee is a specification for a suite of high level communication protocols using small, low-power digital radios based on an IEEE 802 standard for personal area networks.

Referring back to FIG. 2, terminal A can identify a desired WLAN connection with Terminal B, as shown in block 200a. Alternatively, terminal B can identify a desired WLAN connection with Terminal A, as shown in block 200b. Terminal A and terminal B can trigger an identification of each other using a proximity application (as described previously and shown in FIG. 1). The request for an identification of each other can be used to request a WLAN P2P connection. As part of the identification of each other or after a determination that terminal A is in close proximity (or WLAN proximity) to terminal B, terminal A can send WLAN information 202a and terminal B can send WLAN information 202b via the WWAN to a P2P configuration server. The WLAN information can include WLAN versions supported by each wireless device (such as WiFi version 11b, 11g or 11n), the channels available for each wireless device, security types supported by each wireless device (such as Wired Equivalent Privacy (WEP), WiFi Protected Access (WPA), or WPA2), wireless device types (such as an iPad, a smart phone, a laptop, or other computing device), along with any other selected capabilities of each respective wireless device. The WLAN capabilities can include the wireless device capacity, such as memory size, CPU speed, or storage size (hard drive or flash drive capacity). Wireless security types can be used in the prevention of unauthorized access or damage to computers using wireless networks. The P2P configuration server can be any server within the WWAN or in communication with the WWAN. The P2P configuration server can be used to determine a terminal's location, WLAN information, and/or authenticate/authorize the terminals, such as terminals A and B. The P2P configuration server can include a backend service support server. The P2P configuration server can be included in an evolved packet core (EPC) or a packet data network (PDN). Alternatively, the P2P configuration server may be accessible by one or more WWANs via the internet or another type of network connection.

Using the received WLAN information from each terminal, the P2P configuration server can determine if terminal A and terminal B are within an effective WLAN proximity range of each other and/or determine a WLAN P2P configuration 204 which can be used by both terminals A and B. The WLAN P2P configuration may be generated when terminal A and terminal B are within the effective WLAN proximity range of each other. The effective WLAN proximity range can be a range where terminal A and terminal B communicate with each with an acceptable error rate and/or without excessive power consumption on the terminals A and B. The effective WLAN proximity range can be based on a predetermined distance, wireless device receive sensitivity, a WLAN transmission power, or another desired metric. Alternately, the effective WLAN proximity range can be determined dynamically based on WLAN signaling and/or relative obstructions and interference of a particular location. The WLAN P2P configuration can be determined by matching each terminal's WLAN capability provided in the WLAN information communicated to the P2P configuration server by terminals A and B (the first and the second wireless devices). The WLAN P2P configuration can include a channel, a WLAN version (such as WiFi version (11b, 11g or 11n)), or an encryption key used in the WLAN P2P connection.

The P2P configuration server can send the WLAN P2P configuration 206a and 206b via the WWAN to terminal A and terminal B, respectively. Terminal A can be configured to setup a WLAN P2P connection with Terminal B 208a. Similarly, terminal B can be configured to setup a WLAN P2P connection with Terminal A 208b. Terminals A and B can exchange content data using the WLAN P2P connection. The content data transmitted via the WLAN P2P connection can be communicated at a higher speed and at a lower cost with lower power than can typically be accomplished via a WWAN connection.

Figure 3:
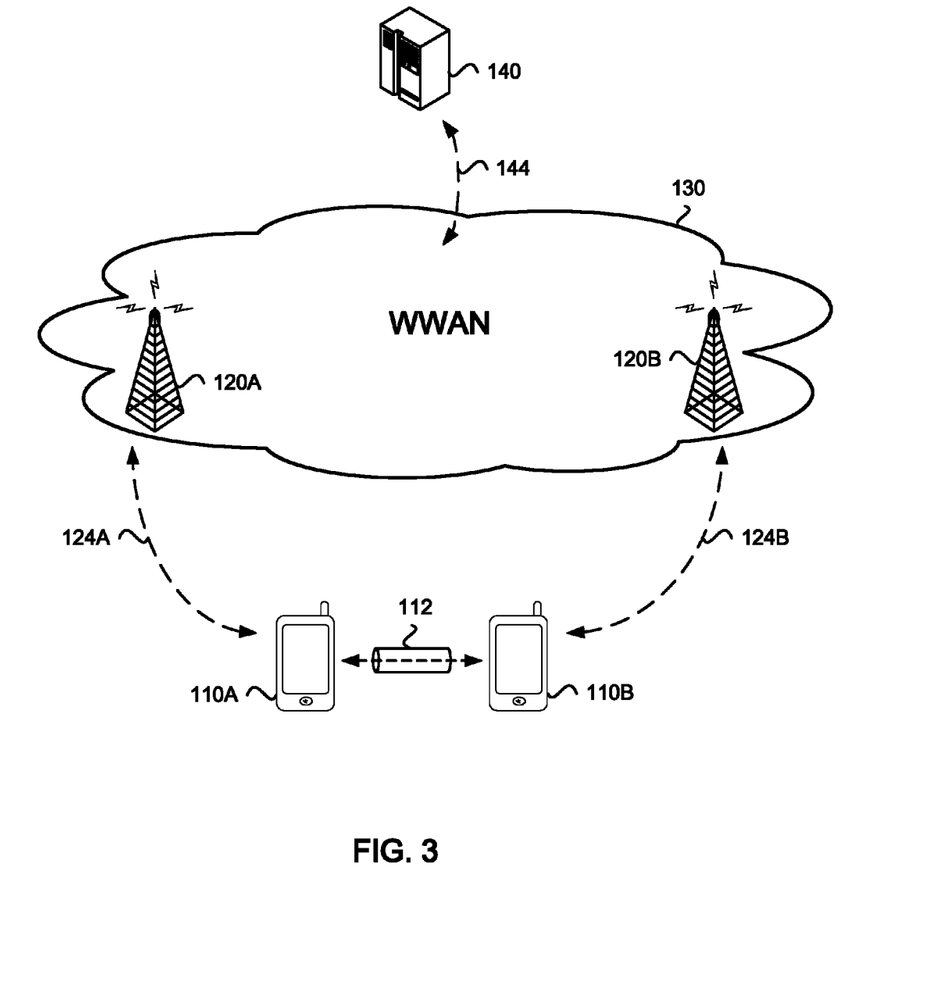
FIG. 3 illustrates a block diagram of two wireless devices communicating using a WLAN P2P connection in accordance with an example.

FIG. 3 provides another illustration of two wireless devices in close proximity to each other communicating with each other through both the WWAN and the WLAN. Close proximity can be within an effective WLAN transmission range. A first wireless device (terminal A) 110A and/or a second wireless device (terminal B) 110B can trigger an identification of each other using a proximity application. After an identification trigger, such as a bump or swing of the mobile devices, a confirmation message or request at each wireless device generated via the WWAN 130 can identify the other wireless device and allow the user of one of the devices to confirm or identify a desired content exchange or transfer with the other wireless device. A content exchange or transfer may occur when a confirmation is received at both wireless devices via the WWAN.

For the identification of the second wireless device 110B and authentication and/or authorization of the first mobile device 110A, the first mobile device can communicate 124A with a first transmission station 120A of the WWAN 130. Likewise, the second mobile device can communicate with a second transmission station 120B of the WWAN, and the communication can include authentication and/or authorization 124B which can include identification of the first wireless device. Both the first or second mobile devices can include WWAN radios and may communicate with the WWAN using the WWAN radios. A P2P configuration server 140 may be used to facilitate the identification, authentication, and/or authorization 144 of the first or second mobile devices. The P2P configuration server can receive WLAN information provided by the first or second mobile devices, and generate the WLAN P2P configuration for the first or second mobile devices. The data content exchange 112 between the first or second mobile devices can be transmitted via the WLAN after the first and second mobile devices are configured with the WLAN P2P configuration.

As illustrated in FIG. 3, the WWAN provides the setup, including identification, authentication, and/or authorization, and the WLAN provides the data content exchange between the first or second mobile devices. Each wireless device can include a WWAN radio, a WLAN radio, a processing module for identifying other wireless devices and setting up the WLAN P2P connection, and/or a proximity sensor for assisting in the identification of the other wireless device. The proximity sensor can include an accelerometer, an inertial measurement unit (IMU), a location sensor, and/or a connection with a GPS receiver.

Figure 4:
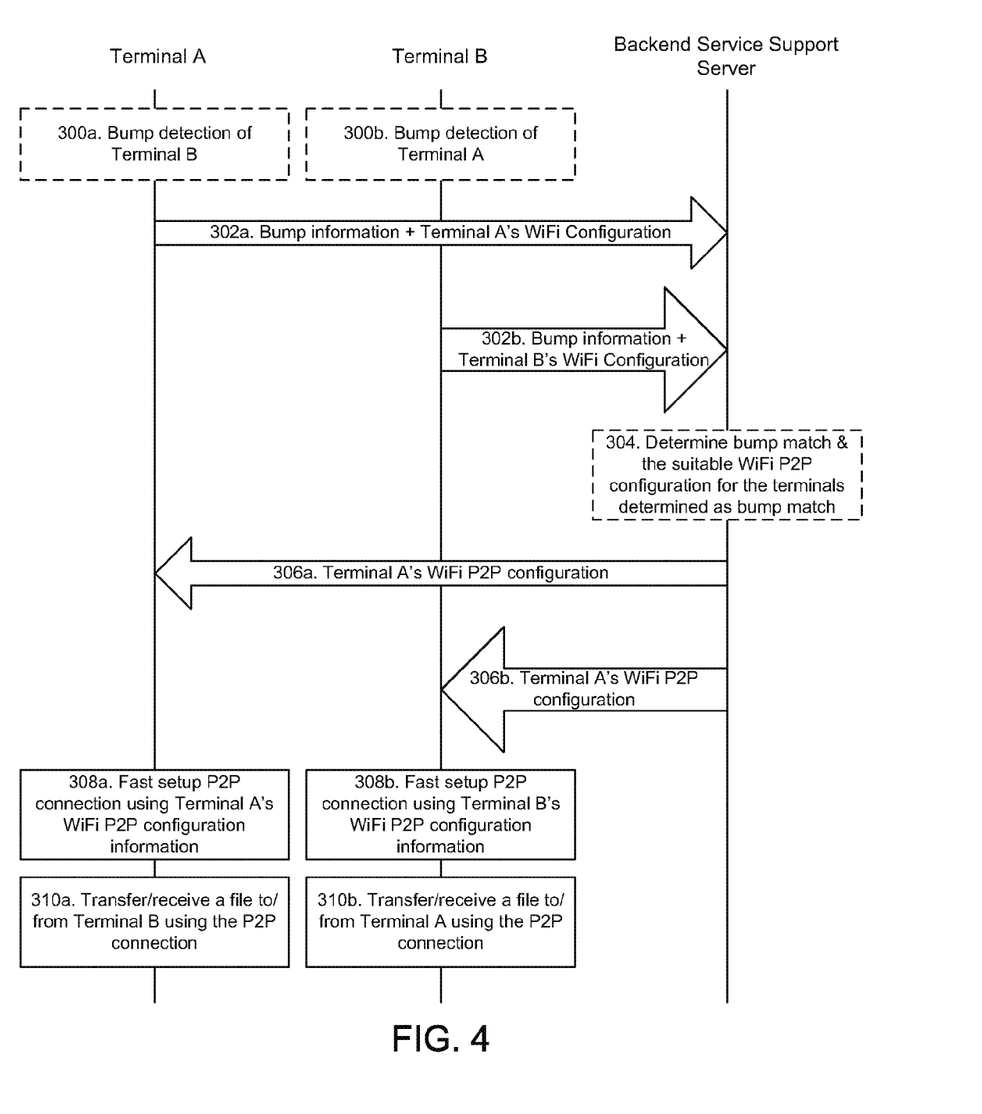
FIG. 4 illustrates an example process for wireless wide area network (WWAN) assisted proximity WiFi peer-to-peer (P2P) connection and offloading in accordance with an example.

FIG. 4 provides another illustration of two wireless devices in close proximity to each other communicating with each other through both the WWAN and a WiFi network. At least two terminals (terminals A and B) can perform a bump detection, by monitoring the sensor data, such as the accelerometer data and/or the location of the handset. Terminal A can perform bump detection of terminal B 300a, and terminal B can perform bump detection of terminal A 300b. After bump detection, both terminals A and B can send the bump information, such as accelerometer data and/or the location of the handset, and the terminal's WiFi configuration information, such as supported WiFi version, channel, and security types, 302a and 302b to the P2P configuration server, such as the backend service support server. When the P2P configuration server receives the bump information and the terminal's WiFi configuration information submitted by the terminals, the P2P configuration server can detect a bump match according to the submitted bump information, and determine suitable WiFi P2P configuration settings according to the submitted WiFi configuration information from the matched terminals (terminals A and B) 304. The suitable WiFi P2P configuration settings information 306a and 306b can be sent to the matched terminals (terminals A and B) by the P2P configuration server. When the terminals A and B receive the WiFi P2P configuration settings information from the server, the terminals can each fast setup a WiFi P2P connection (between terminals A and B) using the WiFi P2P configuration settings information 308a and 308b from the server, and transfer or receive content (or a file) between terminals A and B using the WiFi P2P connection 310a and 310b.

As illustrated in FIGS. 2-4, the WWAN can facilitate the authentication/authorization process and exchange the identification information, such as bump information and WiFi configuration information. However, the content data, such as large files and data streams can be exchanged through the WLAN P2P connection, such as a WiFi P2P connection.

The automatic WLAN P2P setup with WWAN assistance, as described, can reduce end user cost on the WWAN for large file transmission, offload heavy uplink and/or downlink traffic from the WWAN to an inexpensive (or free cost) WLAN, achieve much higher communication bandwidth through the WLAN, reduce latency by reducing the distance of transmitted data, improve end user experience, and/or reduce wireless device power consumption. Although the examples are shown between two devices, more than two devices may also be used. The usage of the WWAN setup and the WLAN data content exchange is not limited to two wireless devices, but can easily be extended into multi-parties for automatic WLAN ad-hoc connections.

Figure 5:
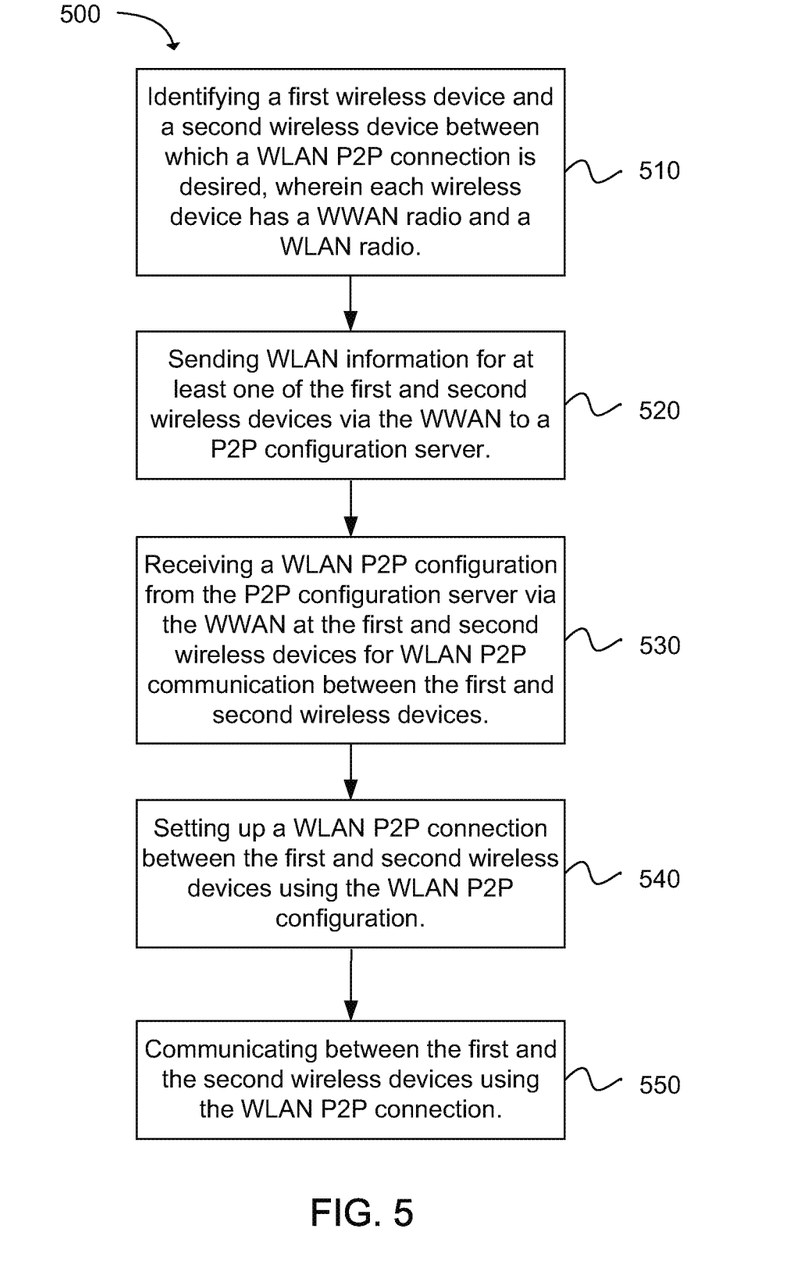
FIG. 5 depicts a flow chart for wireless wide area network (WWAN) assisted proximity wireless local area network (WLAN) peer-to-peer (P2P) connection and offloading by a wireless device in accordance with an example.

Another example provides a method 500 for wireless wide area network (WWAN) assisted proximity wireless local area network (WLAN) peer-to-peer (P2P) connection and offloading, as shown in the flow chart in FIG. 5. The method includes the operation of identifying a first wireless device and a second wireless device between which a WLAN P2P connection is desired, wherein each wireless device has a WWAN radio and a WLAN radio, as in block 510. The operation of sending WLAN information for at least one of the first and second wireless devices via the WWAN to a P2P configuration server follows, as in block 520. The next operation of the method may be receiving a WLAN P2P configuration from the P2P configuration server via the WWAN at the first and second wireless devices for WLAN P2P for communication between the first and second wireless devices, as in block 530. The operation of setting up a WLAN P2P connection between the first and second wireless devices using the WLAN P2P configuration follows, as in block 540. The method can further include communicating between the first and the second wireless devices using the WLAN P2P connection, as in block 550.

WLAN information can include WLAN versions supported by each wireless device, channels available for each wireless device, security types supported by each wireless device, wireless device types, or other capabilities of each of the wireless devices. The WLAN capabilities can include the wireless device capacity, such as memory size, CPU speed, or storage size (hard drive or flash drive capacity). The WLAN P2P configuration can be determined by matching each wireless device's WLAN capability provided in the WLAN information for the first and the second wireless devices received at the P2P configuration server. The WLAN P2P configuration can include a channel, a WLAN version, or an encryption key used in the WLAN P2P connection. The P2P configuration server can select a WLAN P2P configuration that can be achieved by all of the wireless devices that desire to communicate via a WLAN P2P wireless connection. A WWAN protocol of the WWAN radio can provide authentication and authorization for the WLAN P2P connection.

The operation of identifying the first wireless device and the second wireless device between which a WLAN P2P connection is desired can include monitoring a sudden change in motion of the at least one of the first and second wireless devices or monitoring a threshold distance between the second device and the first device in WWAN communication with each other. Below the threshold distance can be a WLAN transmission range for reliable transmission between the first and the second wireless devices. The operation of communicating between the first and the second wireless devices using the WLAN P2P connection can include transferring data content. The data content can include a multimedia stream, a video stream, an audio stream, a graphics file, an audio file, a text file, an executable file, or a multimedia file. The WWAN radio can use a WWAN protocol including a third generation partnership project (3GPP) long term evolution (LTE) standard or an Institute of Electrical and Electronics Engineers (IEEE) 802.16 standard (WiMax). The WLAN radio can use a WLAN protocol including an IEEE 802.11 standard (WiFi), an IEEE 802.15 standard, a Bluetooth standard, a Wireless DisplayPort standard, a WiGig standard, an Ultra-WideBand (UWB) standard, a Wireless HD standard, a Wireless Home Digital Interface (WHDI) standard, or a ZigBee standard.

Figure 6:
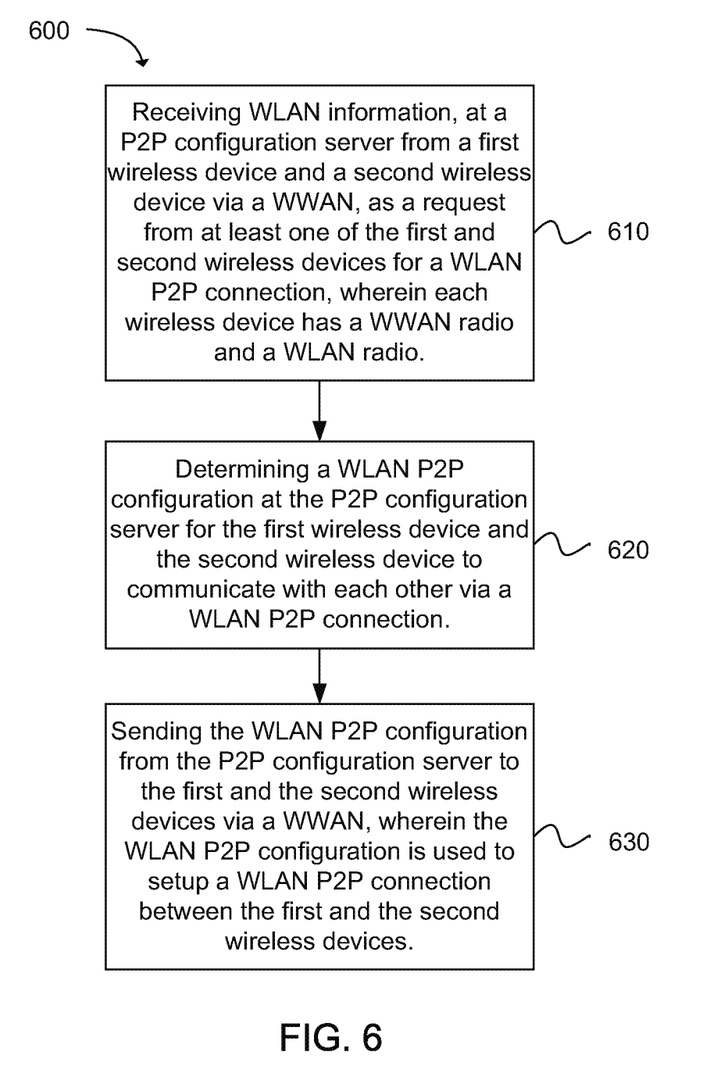
FIG. 6 depicts a flow chart for wireless wide area network (WWAN) assisted proximity wireless local area network (WLAN) peer-to-peer (P2P) connection and offloading at a P2P configuration server in accordance with an example.

Another example provides a method 600 for wireless wide area network (WWAN) assisted proximity wireless local area network (WLAN) peer-to-peer (P2P) connection and offloading, as shown in the flow chart in FIG. 6. The method includes the operation of receiving WLAN information, at a P2P configuration server from a first wireless device and a second wireless device via a WWAN, as a request from at least one of the first and second wireless devices for a WLAN P2P connection, wherein each wireless device has a WWAN radio and a WLAN radio, as in block 610. The operation of determining a WLAN P2P configuration at the P2P configuration server for the first wireless device and the second wireless device to communicate with each other via a WLAN P2P connection follows, as in block 620. The next operation of the method can be sending the WLAN P2P configuration from the P2P configuration server to the first and the second wireless devices via a WWAN, wherein the WLAN P2P configuration is used to setup a WLAN P2P connection between the first and the second wireless devices, as in block 630.

The operation of determining the WLAN P2P configuration can use the WLAN information from at least one of the first and second wireless devices or the proximity information from at least one of the first and second wireless devices.

In another example, a transmission station can be in wireless communication with a mobile device. The transmission stations can be included within a centralized, cooperative, or cloud radio access network (C-RAN). In the C-RAN, the transmission station (or eNodeB) functionality can be subdivided between a base band unit (BBU) processing pool and a remote radio unit (RRU) or a remote radio head (RRH) with optical fiber connecting the BBU to the RRU.

Figure 7:
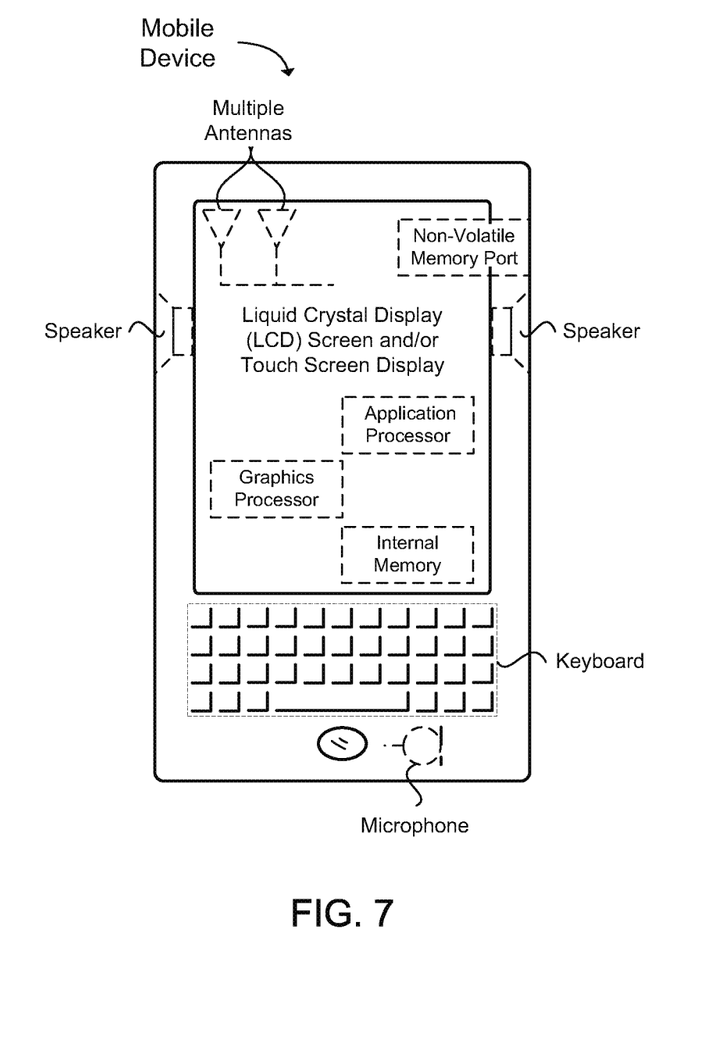
FIG. 7 illustrates a diagram of a mobile device in accordance with an example.

FIG. 7 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer program product, comprising a non-transitory computer readable storage medium having a computer readable program code embodied therein, the computer readable program code adapted to be executed to implement a method for wireless wide area network (WWAN) assisted proximity wireless local area network (WLAN) peer-to-peer (P2P) connection and offloading, comprising:
    identifying, by a first wireless device and a second wireless device using a proximity application via a WWAN connection, a desired WLAN P2P connection between the first and second wireless devices, wherein each wireless device has a WWAN radio and a WLAN radio;
    sending WLAN configuration information for the first and second wireless devices and proximity information for the first and second wireless devices, via the WWAN connection to a P2P configuration server, in response to identifying the WLAN connection desired between the first and second wireless devices;
    receiving WLAN P2P configuration settings, from the P2P configuration server via the WWAN connection by the first and second wireless devices, for WLAN P2P communication between the first and second wireless devices, wherein the WLAN P2P configuration settings are based on the WLAN configuration information and the proximity information sent to the P2P configuration server in response to identifying the WLAN connection desired between the first and second wireless devices;
    setting up a WLAN P2P connection between the first and second wireless devices, by the first and second wireless device, using the WLAN P2P configuration settings received from the P2P configuration server via the WWAN connection; and
    communicating between the first and the second wireless devices using the WLAN P2P connection.

2. The computer program product of claim 1, wherein WLAN configuration information is selected from the group consisting of WLAN versions supported by each wireless device, channels available for each wireless device, security types supported by each wireless device, wireless device types, wireless device capabilities, and combinations thereof.

3. The computer program product of claim 1, wherein the WLAN P2P configuration settings are determined by matching each wireless device's WLAN capability provided in the WLAN configuration information for the first and the second wireless devices received at the P2P configuration server.

4. The computer program product of claim 1, wherein the WLAN P2P configuration settings includes a channel, a WLAN version, or an encryption key used in the WLAN P2P connection.

5. The computer program product of claim 1, wherein a WWAN protocol of the WWAN radio provides authentication and authorization for the WLAN P2P connection.

6. The computer program product of claim 1, wherein the proximity information comprises a sudden change in motion of the at least one of the first and second wireless devices or a threshold distance between the second device and the first device in WWAN communication with each other, wherein below the threshold distance is a WLAN transmission range for reliable transmission between the first and the second wireless devices.

7. The computer program product of claim 1, wherein communicating between the first and the second wireless devices using the WLAN P2P connection includes transferring data content selected from the group consisting of a multimedia stream, a video stream, an audio stream, a graphics file, an audio file, a text file, an executable file, a multimedia file, and combinations thereof.

8. The computer program product of claim 1, wherein the WWAN radio uses a WWAN protocol selected from the group consisting of a third generation partnership project (3GPP) long term evolution (LTE) standard and an Institute of Electrical and Electronics Engineers (IEEE) 802.16 standard, and the WLAN radio uses a WLAN protocol selected from the group consisting of an IEEE 802.11 standard, an IEEE 802.15 standard, a Bluetooth standard, a Wireless DisplayPort standard, a WiGig standard, an Ultra-WideBand (UWB) standard, a Wireless HD standard, a Wireless Home Digital Interface (WHDI) standard, and a ZigBee standard.

9. A computer program product, comprising a non-transitory computer readable storage medium having a computer readable program code embodied therein, the computer readable program code adapted to be executed to implement a method for wireless wide area network (WWAN) assisted proximity wireless local area network (WLAN) peer-to-peer (P2P) connection and offloading, comprising:
  receiving WLAN configuration information and proximity information, at a P2P configuration server from a first wireless device and a second wireless device via a WWAN connection, as a request for a desired WLAN P2P connection between the first and second wireless devices, wherein each wireless device has a WWAN radio and a WLAN radio;
  determining an identification trigger match between the first wireless device and the second wireless device based on the proximity information;
  determining WLAN P2P configuration settings at the P2P configuration server, for the first wireless device and the second wireless device to communicate with each other via a WLAN P2P connection, from the received WLAN configuration information for the first wireless device and the second wireless device when the identification trigger is determined to be a match between the first wireless device and the second wireless device; and
  sending the WLAN P2P configuration settings from the P2P configuration server to the first and the second wireless devices via the WWAN connection, wherein the WLAN P2P configuration settings are used to setup a WLAN P2P connection between the first and the second wireless devices.

10. The computer program product of claim 9, wherein the WLAN configuration information includes the WLAN capabilities of each of the wireless devices.

11. The computer program product of claim 9, wherein WLAN configuration information is selected from the group consisting of WLAN versions supported by each wireless device, channels available for each wireless device, security types supported by each wireless device, wireless device types, wireless device capabilities, and combinations thereof.

12. The computer program product of claim 9, wherein the WWAN radio uses a WWAN protocol selected from the group consisting of a third generation partnership project (3GPP) long term evolution (LTE) standard and an Institute of Electrical and Electronics Engineers (IEEE) 802.16 standard, and the WLAN radio uses a WLAN protocol selected from the group consisting of an IEEE 802.11 standard, an IEEE 802.15 standard, a Bluetooth standard, a Wireless DisplayPort standard, a WiGig standard, an Ultra-WideBand (UWB) standard, a Wireless HD standard, a Wireless Home Digital Interface (WHDI) standard, and a ZigBee standard.

13. The computer program product of claim 9, wherein the WLAN P2P configuration settings include a channel, a WLAN version, or an encryption key used in the WLAN P2P connection.

14. A wireless device for wireless wide area network (WWAN) assisted proximity wireless local area network (WLAN) peer-to-peer (P2P) connection and offloading, comprising:
  a WWAN radio for sending WLAN configuration information for the wireless device and proximity information for the wireless device via a WWAN connection to a P2P configuration server in response to detection of an identification trigger when a WLAN P2P connection is desired between the wireless device and a second wireless device, and for receiving WLAN P2P configuration settings via the WWAN connection from the P2P configuration server for communication between the wireless device and the second wireless device in response to detection of the identification trigger when the WLAN P2P connection is desired between wireless device and the second wireless device, wherein the WLAN P2P configuration settings are based on the WLAN configuration information and the proximity information; and
  a processing module for identifying the second wireless device for which the WLAN P2P connection is desired, and setting up the WLAN P2P connection with the second wireless device by configuring a WLAN radio with the WLAN P2P configuration settings, wherein the WLAN radio communicates with the second wireless device using the WLAN P2P connection.

15. The wireless device of claim 14, further comprising:
  a proximity sensor for assisting in the identification of the second mobile device for the WLAN P2P connection in response to the identification trigger.

16. The wireless device of claim 15, wherein the proximity sensor is selected from the group consisting of an accelerometer, an inertial measurement unit (IMU), a location sensor, and combinations thereof.

17. The wireless device of claim 14, wherein the wireless devices include an antenna, a touch sensitive display screen, a speaker, a microphone, a graphics processor, an application processor, internal memory, a non-volatile memory port, or combinations thereof.

18. The wireless device of claim 14, wherein the wireless device is selected from the group consisting of a user equipment (UE) and a mobile station (MS), and the P2P configuration server is coupled to a transmission station, wherein the transmission station is selected from the group consisting of an evolved Node B (eNodeB), a base station (BS), a base band unit (BBU), and combinations thereof.

* * * * *